United States Patent
Scherer et al.

(10) Patent No.: US 9,843,795 B1
(45) Date of Patent: Dec. 12, 2017

(54) PHOTO BOOTH WITH INTEGRATED SELF-DIAGNOSTIC SYSTEMS

(71) Applicant: Social Flash Media, Inc., Austin, TX (US)

(72) Inventors: Stephen Scherer, Austin, TX (US); Gregory Bryant, Austin, TX (US); Phillip McCartney, Austin, TX (US); Derick Alderman, Austin, TX (US)

(73) Assignee: SOCIAL FLASH MEDIA, INC., Austin, TX (US)

(*) Notice: Subject to any disclaimer, the term of this patent is extended or adjusted under 35 U.S.C. 154(b) by 0 days.

(21) Appl. No.: 15/244,754

(22) Filed: Aug. 23, 2016

(51) Int. Cl.
| | | |
|---|---|---|
| *H04N 17/00* | (2006.01) | |
| *G06Q 10/06* | (2012.01) | |
| *G06Q 10/10* | (2012.01) | |
| *G06T 7/00* | (2017.01) | |
| *G03B 17/53* | (2006.01) | |
| *G06Q 10/00* | (2012.01) | |

(52) U.S. Cl.
CPC ........... *H04N 17/002* (2013.01); *G03B 17/53* (2013.01); *G06Q 10/0639* (2013.01); *G06Q 10/1095* (2013.01); *G06Q 10/20* (2013.01); *G06T 7/0002* (2013.01); *G06T 2207/30168* (2013.01)

(58) Field of Classification Search
CPC .......................... G03B 17/53; H04N 1/00289
See application file for complete search history.

(56) References Cited

U.S. PATENT DOCUMENTS

| | | | | |
|---|---|---|---|---|
| 6,085,195 | A * | 7/2000 | Hoyt ............ | G03B 17/53 |
| 6,282,373 | B1 * | 8/2001 | Glogovsky ........ | G03D 15/005 |
| | | | | 235/385 |
| 2001/0046381 | A1 * | 11/2001 | Ichikawa ........... | G03B 15/00 |
| | | | | 396/2 |
| 2004/0105672 | A1 * | 6/2004 | Misumi ............ | G06K 9/00248 |
| | | | | 396/2 |
| 2005/0248658 | A1 * | 11/2005 | Ernest Corley ....... | G03B 13/18 |
| | | | | 348/207.99 |
| 2009/0118849 | A1 * | 5/2009 | Dery ............... | G03B 17/53 |
| | | | | 700/94 |
| 2011/0234779 | A1 * | 9/2011 | Weisberg ........... | G03B 17/53 |
| | | | | 348/61 |
| 2013/0307998 | A1 * | 11/2013 | Tautenhahn ....... | H04N 1/00289 |
| | | | | 348/207.1 |
| 2015/0228034 | A1 * | 8/2015 | Alderman .......... | G06Q 50/01 |
| | | | | 705/7.32 |

* cited by examiner

*Primary Examiner* — W B Perkey
(74) *Attorney, Agent, or Firm* — Michael Best & Friedrich LLP

(57) ABSTRACT

A photo booth system including a photo booth and a management system for providing self-diagnostic and health reporting. In some cases, the photo booth and/or the management system may initiate a diagnostic test to determine the photo booth's operational state. In some cases, the management system may select and/or dispatch a maintenance personnel to the photo booth if the booth is experiencing an issue.

20 Claims, 6 Drawing Sheets

PHOTO BOOTH WITH INTEGRATED SELF-DIAGNOSTIC SYSTEMS

BACKGROUND

Many companies rent or purchase photo booths for extended placement at one or more venues to use the photo booth as a marketing tool. Typically, these photo booths are large self-contained units that are set up on-site by either an event coordinator or a booth administrator. Unfortunately, once set up and placed on-site, they may experience one or more errors or maintenance issues over the period of time associated with the extended placement. Thus, a company charged with maintaining the operational state of the photo booth may visit the booth regularly, such as once a month, which is costly. Additionally, any issues with the booth may go undetected for a length of time depending on the regularity of the maintenance visits and the exact timing and type of the issue that occurred.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
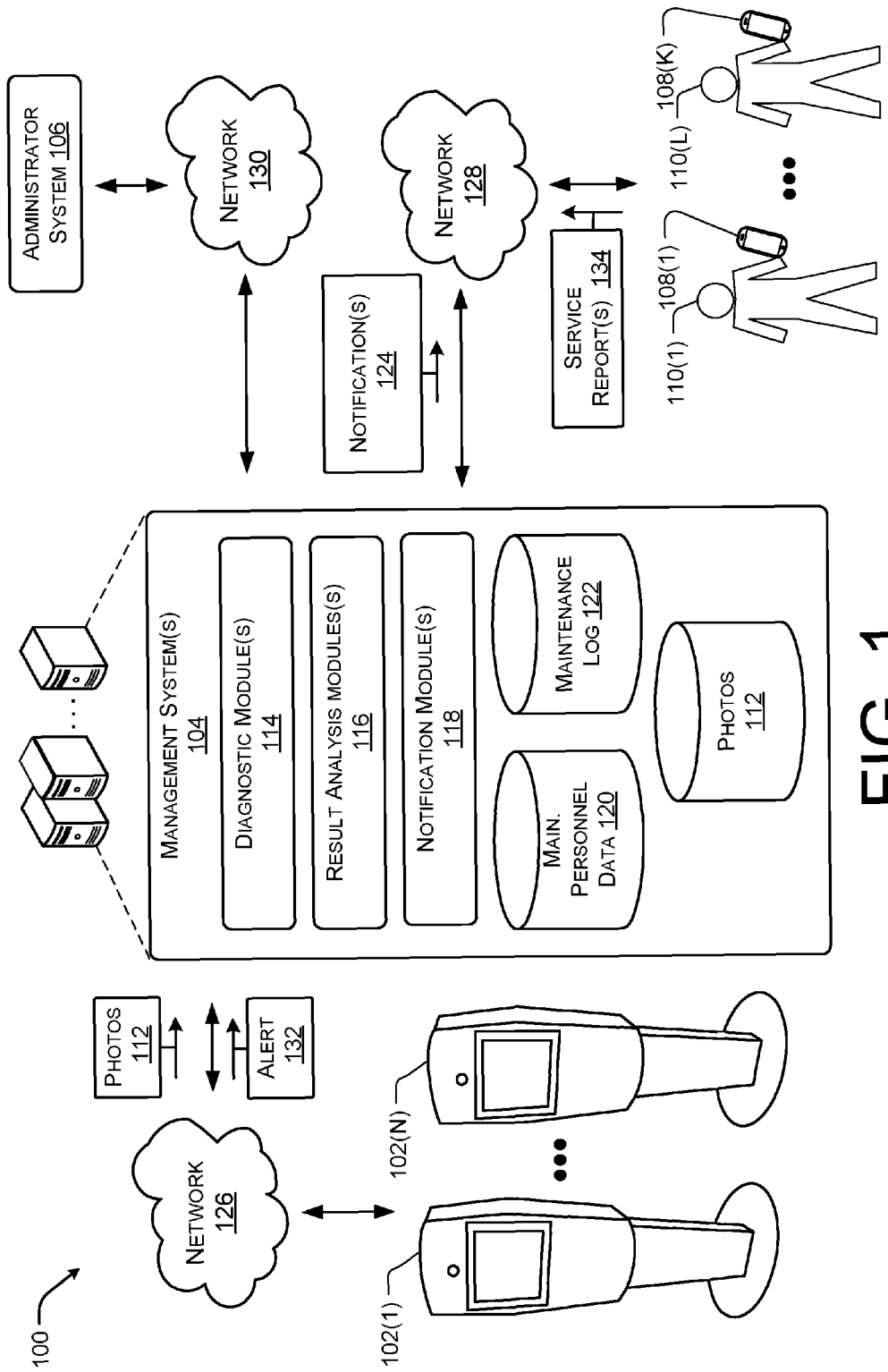
FIG. 1 illustrates an example system for monitoring an operational state of a photo booth according to some implementations.

This disclosure includes techniques and implementations for providing a photo booth with remote diagnostic and alert capabilities. In particular, this disclosure describes a photo booth configured to perform self-initiated and remote initiated maintenance diagnostics and to alert in a management system in response to a failure of one or more systems. For example, the camera of the photo booth may become unfocused due to individuals bumping or touching the photo booth during use. The booth may perform a diagnostic test including capturing a photo and analyzing the resulting image or a histogram associated with the image for clarity. In some cases, if the photo fails to exceed one or more clarity thresholds (e.g., the resulting image is blurry), the photo booth may attempt an auto-calibration of the camera, and cause the camera to capture another image. The photo booth may also analyze the second image against the clarity thresholds. If the second photo is also unclear or fails to meet the clarity thresholds, the booth may send an alert to the management system notifying the management system of the issue with the image clarity.

The management system may record the issue, identify a maintenance vendor associated with the particular booth reporting the issue. For instance, the booth may be under a maintenance contract from a third party (e.g., a party unrelated to the venue or the booth provider) and the third party may be notified that the booth is malfunctioning. In one implementation, the booth and/or the management system may send a notification to a device associated with the maintenance vendor. For instance, the maintenance vendor may install or download an application to a device that allows the booth and/or the management system to send the alerts or notification directly to a maintenance personnel associated with the device in a secure manner. The device may provide a pop-notification, vibrate, output a noise, or otherwise alert the maintenance personnel to the issue with the booth.

In some cases, the management system may select from a group of available maintenance vendors or maintenance personnel based on availability. For instance, the management system may access a calendar or schedule associated with the maintenance vendors or maintenance personnel and select a maintenance personnel to visit the booth based on availability and/or current location of the various maintenance personnel. In some specific examples, the booth or management system may schedule a maintenance visit for the operator of the device by inserting the visit into a calendar or schedule associated with the operator.

In these cases, the maintenance personnel may prevent the photo booth from being down for extended periods of time between regular maintenance visits. Additionally, the maintenance vendor may be able to go longer periods between regular maintenance visits and, thereby, reduce the overall operating cost associated with the photo booth.

In the example above, the issue detected by the booth was associated with image clarity, however, it should be understood the photo booth may be configured to detect various types of issues. For example, the booth may be configured to run diagnostics tests associated with other camera components, such as the flash, red-eye, shutter, apertures, zoom, etc. Additionally, the booth may be configured to run diagnostics on other components, such as one or more communication interfaces, projectors, displays, computer-readable media or memory devices, environmental sensor, among others.

In some cases, the photo booth may generate a log file associated with the diagnostic tests run, which may include diagnostic data, e.g. the results of each diagnostic test, as well as audit data, e.g. the maintenance personnel assigned to correct each issue, a length of time or duration associated with each issue (e.g., the length of time the shutter was functioning improperly prior to repair). The log file may then be accessible to one or more administrator systems associated with the management system. In this manner, a company providing the photo booth for lease or sale may monitor the productivity of a third party maintenance vendor.

FIG. 1 illustrates an example system 100 for monitoring the health and functionality of one or more photo booths 102(1)-(N). For example, the system 100, in addition to the photo booths 102(1)-(N), may include a management system 104, an administrative system 106, and/or an application operating on one or more devices 108(1)-(K) associated with various maintenance personnel 110(1)-(L). In general, the system 100 may be configured to monitor the functionally of various components associated with each of the photo booths 102(1)-(N) and upon detecting one or more issues to notify a local maintenance personnel 110(1)-(L) that the booth 102 is malfunctioning and that a maintenance visit should be scheduled.

The photo booths 102(1)-(N) may be self-contained units for capturing image data, such as photos 112. The photo booths 102(1)-(N), generally, include at least one camera for capturing visual data (photos or images) from the environment and a communication interface for providing the photos 112 to the management system 104 for processing and distribution. In some cases, a photo booth 102 may be installed in a permanent location. In other cases, a photo booth 102 may be portable and moved from venue to venue. For example, the photo booths 102(1)-(N) may be collapsible or modular, such that the photo booths 102(1)-(N) may be disassembled, moved to a new location, and reassembled. In some instances, the photo booths 102(1)-(N) may be configured to provide an enclosed environment from which the photos 112 of the guests may be captured. In other instances, the photo booths 102(1)-(N) may be an open air design (e.g., no doors, back wall, or curtains). In one particular implementation, the photo booths 102(1)-(N) may be convertible from an open air systems to enclosed systems.

In some cases, the photo booths 102(1)-(N) may include a self-diagnostic module (not shown) that may run one or more diagnostic tests on the booth 102. For example, the booth 102 may run a self-diagnostic test at various period of time (such as daily, weekly, hourly, etc.). The self-diagnostic test may include testing components, such as the flash, aperture, shutters, etc. of the camera, a projector, a display, input interfaces. For example, the self-diagnostic test may attempt the activate the flash, shutter, or aperture of the camera as well as to cause the projector to project an image on a backdrop or wall opposite the photo booth 102. The photo booth 102 may also include various sensors, such as photo or light sensors to detect the flash and/or projection of an image by the projector, mechanical sensors to detect movement of components (e.g., of the movement of the shutter), electronic sensors to detect the activation of various components (such as a communication interface), etc.

The photo booths 102(1)-(N) may also be configured to send an alert 132 to the management system 104 to notify the management system 104 that either further diagnostics should be run on the booth 102 or that a maintenance personnel 110(1)-(L) should be dispatched to repair the booth 102. In the illustrated example, the alert 132 is sent to the management system 104, however, in other examples, the booth 102 may be assigned a particular maintenance personnel 110 and the alert 132 may be sent directly from the photo booth 102 to a device 108 associated with the assigned maintenance personnel 110.

The management system 104 may host any number of cloud-based services for sharing photos captured by each photo booths 102(1)-(N), delivering advertisements in conjunction with the photos 112 to various guest and third party retails associated with each booth 102, and/or monitoring the health or operational functionality associated with each photo booth 102. The management system 104, as illustrated, is implemented as one or more cloud-based services hosted on servers. In general, cloud-based services refer to a network accessible platform implemented as a computing infrastructure of processors, storage, software, data access, and so forth that is maintained and accessible via a network such as the Internet. The cloud-based services do not require end-user knowledge of the physical location and configuration of the system that delivers the services. Common expressions associated with cloud services include "on-demand computing," "software as a service (SaaS)," "platform computing," "network accessible platform" and so forth.

The servers may include various types of computing devices and may be owned by a single entity and collocated at a common data center or may be located at separate data centers. Alternatively, the servers may be owned and operated by independent entities at separate locations. The servers may be further arranged in any number of ways, such as server farms, stacks, and the like that are commonly used in data centers.

The management system 104 may include one or more modules for monitoring and/or performing diagnostics associated with the photo booths 102(1)-(N). For instance, the management system 104 may include one or more diagnostic modules 114, one or more result analysis modules 116, and/or one or more notification modules 118. The diagnostic modules 114 may be configured to cause the photo booths 102(1)-(N) to perform various tests on the hardware and/or systems to determine if the booth 102 is operating within expected thresholds. For example, the diagnostic module 114 may cause a photo booth 102 to respond to a request to determine if the communication interface is operating as accepted or to capture a photo 112 and to return the image to the management system 104 for analysis to determine if the flash, aperture, shutter, or other camera component are operating as expected.

The result analysis module 116 may be configured to receive a result from the test initiated by the diagnostic module 118 to determine if the booth 102 is operating as expected. For example, the result analysis module 116 may be configured to receive a photo 112 captured by the booth 102 and to compare or analyze the photo 112 to determine if various thresholds are met or exceeded. For instance, the result analysis module 116 may determine that the flash failed to activate or activated at an incorrect time when the photo 112 fails to meet a brightness threshold, histogram, or other image analysis method associated with the light captured by the photo. In another example, the result analysis module 116 may determine the shutter failed to open if the image fails to meet a color contrast threshold.

Similarly, the result analysis module 116 may process on-going or normal data received from the photo booths 102(1)-(N). For example, the result analysis module 116 may process the photos 112 received from the photo booths 102(1)-(N) to determine that the components of the photo booths 102(1)-(N) are operating within desired parameters. In some cases, the result analysis module 116 may analyze each of the photos 112 received, while in other cases, the result analysis module 116 may analyze random photos 112 or periodically selected photos 112 to determine if the photo booths 102(1)-(N) are operating within desired parameters. Additionally, the result analysis module 116 may monitor the status of the communication channels between the management system 104 and each of the photo booths 102(1)-(N). For instance, repeatedly disconnection between a photo booth and the management system may indicate issues with a communication interface of the booth experiencing issues.

In another example, the diagnostic module 114 may cause a projector associated with the photo booth 102 to project a particular image onto a backdrop or wall and to cause the camera of the photo booth 102 to capture an image of the backdrop or wall while the projector projects the particular image. Result analysis module 116 may then be configured to analyze the photo 112 captured by the booth 112 for various aspects of the particular image against various thresholds, such as a color threshold, shape reproduction threshold, objects threshold (e.g., does the object reproduce correctly), location threshold (e.g., location of the objects within the photo 112), contrast threshold, sharpness threshold, image noise threshold, exposure range threshold, tone reproduction threshold, distortion threshold, vignetting threshold, exposure thresholds, lateral chromatic aberration (LCA) thresholds, lens flare thresholds, among others.

The notification module 118 may, in response to a determination that the booth 102 is malfunctioning or may be operating outside of normal parameters, be configured to identify a maintenance personnel 110 and to provide the identified maintenance personnel 110 with a notification 124 that the booth 102 is malfunctioning. In some cases, the notification module 118 may select the maintenance personnel 110 by determining that the maintenance personnel 110 associated with the photo booth 102, is available, and/or within a predefined geographic proximity (e.g., 20 miles) to the booth 102. In some cases, the selection of the maintenance personnel 110 may be based on a location (e.g., Global Position System (GPS) signal of the device 108 associated with personnel 110) and/or a schedule or calendar accessible to the management system. In other cases, the notification module 118 may be configured to send a notification 124 to a maintenance venue (not shown) that then would be responsible to assign a maintenance personnel 110 to the booth 102.

In some implementations, the management system 104 may also store data associated with the modules 114-118. For instance, in the illustrated example, the management system 104 stores maintenance personnel data 120, maintenance log 122, and photo/images 112. The maintenance personnel data 120 may be utilized or accessed by the notification module 118 to assist with selecting a maintenance personnel 110(1)-(L) to perform a maintenance visit to a booth 102 operating outside of the expected thresholds.

The maintenance log 122 may include data associated with each diagnostic, test, result, and/or determination related to the booth 102(1)-(N) by the diagnostic module 114 and/or the result analysis modules 116. The maintenance log 122 may also include data related to the maintenance venue or maintenance personnel 110(1)-(L) assigned to affect repair of a malfunctioning booth 102. The maintenance log 122 may be sent or accessible to the administrative system 106 to allow an administrator to review the log files to monitor the effectiveness, timeliness of various maintenance personnel 110(1)-(L) as well as the overall up time of the photo booths 102(1)-(N).

The photos 112 captured by the various booths 102(1)-(N) may also be maintained by the management system 104 to allow either the administer or the maintenance personnel 110(1)-(L) to view the photos 112 that caused the notification 124 to be sent. In this manner, the maintenance personnel 110(1)-(L) assigned to repair the booth 102 may be able to more quickly determine the problem.

In some cases, after the maintenance is performed by the maintenance personnel 110 or the issue with the booth 102 is corrected, the maintenance personnel 110 may input via the devices 108(1)-(K) and cause the devices 108(1)-(K) to send a service report 134 to the management system 104. In some cases, the service report 134 may be added to the maintenance log 122 associated with the booth 102 repaired or inspected and, thus, made available to the administrator via the administrative system 106.

In the illustrated example, the photo booths 102(1)-(N) are shown as communicatively coupled to the management system 104 via a network 126, the devices 108(1)-(K) are shown as communicatively coupled to the management system 104 via network 128, and the administrative system 104 is shown as communicatively coupled to the management system 104 via network 130. In some cases, the photo booths 102(1)-(N), the device 108(1)-(K), and/or the administrative system 106 may be communicatively coupled to the networks 126, 128, and 130 via wired technologies (e.g., wires, USB, fiber optic cable, etc.), wireless technologies (e.g., RF, cellular, satellite, Bluetooth, etc.), or other connection technologies. The networks 126, 128 and 130 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The networks 126, 128 and 130 carry data, such as photos 112. In the illustrated example, the networks 126, 128 and 130 are shown as separate networks, however, in some cases, the networks 126, 128 and 130 may be the same network.

In some examples, the photo booth 102 may also capture images in response to receiving customer or user input. The booth 102 may provide the photos 112 to the management system 104 or to an account or device 108 associated with the customer. For example, the booth may provide the photo 112 to the management system 104 which may then provide or post the photo 112 to the customer's or user's social media pages, email or message the photo to the customer or user, or send the photo to a device associated with the customer or user. In some cases, the photos 112 may also be provided to one or more third parties associated with the booth and/or the customer.

Figure 2:
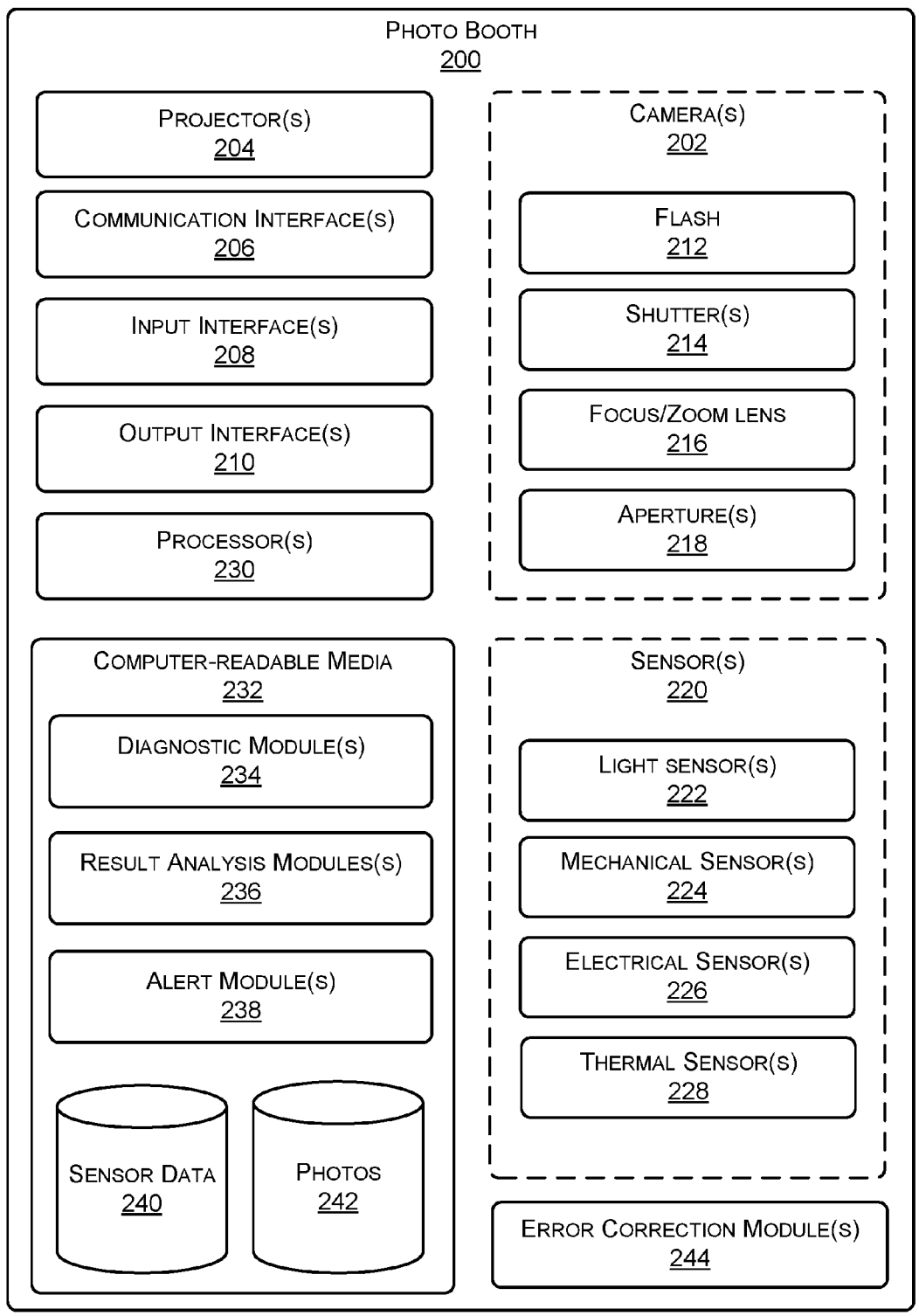
FIG. 2 illustrates example components of a photo booth according to some implementations.

FIG. 2 illustrates example components of a photo booth 200 according to some implementations. As described above, a photo booth 200 may be a self-contained unit for taking photos placed within an environment, such as a movie theater. In some cases, the photo booth 200 may be installed in a permanent location, while in other cases, the photo booth 200 may be portable. For example, the photo booth 200 may be collapsible or modular, such that the photo booth 200 may be disassembled, moved to a different location, and then reassembled. In some instances, the photo booth 200 may be configured to provide an enclosed environment from which the photos 200 of guests may be captured, while in other instances, the photo booth 200 may be an open air design. In one particular implementation, the photo booth 200 may be convertible from an open air system to an enclosed system.

The photo booth 200 may include at least one camera 202 for capturing visual data from the environment, a projector 204 for projecting images into the environment, at least one communication interface 206 for providing the photos and alerts to a management system associated with the photo booth 200, at least one input interface 208 for collecting data from guest of the photo booth 200, and at least one output interface 210 for presenting information to the guests.

The one or more cameras 202 may be placed throughout the photo booth 200. For example, the cameras 202 may be positioned to take multiple photographs of an end user within the photo booth 200 at various angles and/or views. The cameras 202 may be of various sizes and quality, for instance, the cameras 202 may include one or more wide screen cameras, three dimensional (3D) cameras, high definition cameras, video cameras, among other types of cameras. In general, the cameras 202 may each include various components and/or attributes, such as a flash 212, one or more shutters 214, a focus or zoom lens 216, and/or one or more apertures 218.

The projector 204 may be included to project an image including a photo and/or advertisement on a surface (e.g., a wall) or backdrop placed behind the booth 200. In these cases, the projector may project a grid or other pattern on the surface in the environment or on the backdrop and the sensors or camera(s) 202 may capture image data associated with the surface. The booth 200 may then determine a projection scheme to cause the photo or advertisement to appear visually correct on the surface even in the case of a non-uniform surface.

The one or more communication interfaces 206 are configured to facilitate communication between one or more networks and/or one or more cloud-based management systems (e.g., management systems 104 of FIG. 1) and the photo booth 200. The communication interfaces 206 may also facilitate communication between one or more wireless access points, a master device, and/or one or more other computing devices as part of an ad-hoc or home network system. The communication interfaces 206 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interfaces 206 may also enable device to device communication such as between photo booth 200 and one or more printers and/or one or more other electronic devices in proximity to the photo booth 200.

The input interfaces 208 and the output interfaces 210 may be included to display or provide information to an end user (such as a guest) and to receive user inputs from the end user. The interfaces 208 and 210 may include various systems for interacting with the photo booth 200, such as mechanical input devices (e.g., keyboards, mice, buttons, etc.), displays, touch screens, input sensors (e.g., motion, age, gender, fingerprint, facial recognition, or gesture sensors), and/or microphones for capturing natural language input such as speech.

The photo booth 200 may also include various sensors 220 that may collect sensor data that is usable to determine if the booth 202 is fully operational. For example, the photo booth 200 may include light or photo sensors 222, mechanical sensors 224 (e.g., pressure, force, or motion sensors), electrical sensors 226 (capacitive, resistive, current, or potential based sensors), and thermal sensors 228.

The photo booth 200 includes one or more processors 230, such as at least one or more access components, control logic circuits, central processing units, or processors, as well as one or more computer-readable media 232 to perform the function of the photo booth 200 and/or store content. Additionally, each of the processors 230 may itself comprise one or more processors or processing cores.

Depending on the configuration, the computer-readable media 232 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 230.

Several modules such as instruction, data stores, and so forth may be stored within the computer-readable media 232 and configured to execute on the processors 230. For example, as illustrated, the computer-readable media 232 stores a diagnostic module 234, a result analysis module 236, and an alert module 238. The computer-readable media 232 may also be configured to store data, such as sensor data 240 collected by the sensors 220 and photos 242 captured by the camera 202. In some cases, the photos 242 may include data associated with the photo 242 as well as the image itself.

The diagnostic module 234 may be configured to cause the camera 202, projector 204, communication interfaces 206, input interfaces 208, and/or output interfaces 210 to perform various functions to determine if the camera 202, projector 204, communication interfaces 206, input interfaces 208, and/or output interfaces 210 are operating as expected. For example, the diagnostic module 234 may cause a communication interface to request a response from the management system. In another example, the diagnostic module 234 may cause various components of the camera 202, such as the shutters 214, focus or zoom lens 216, and/or apertures 218, to actuate to determine that the shutters 214, focus or zoom lens 216, and/or apertures 218 are operational.

The result analysis module 236 may be configured to analyze data associated with a test initiated by the diagnostic module 234. For example, the result analysis module 236 may be configured to receive a photo 242 captured by the camera 202 and to compare or analyze the photo 242 to determine if various thresholds are met or exceeded. For instance, the result analysis module 234 may determine that the flash 212 failed to activate or activated at an incorrect time when the photo fails to meet a brightness threshold, histogram, or other image analysis technique associated with the light captured by the photo. In another example, the result analysis module 234 may determine the shutter 214 failed to open if the image fails to meet a color contrast threshold. In other cases, the result analysis module 234 may analyze the sensor data 240 to determine if the components are operating correctly. For instance, the sensor data 240 collected by the light sensor 222 may indicate if the flash 212 failed to activate or that no one was present in the photo 242 and that the photo 242 may be deleted.

Similarly, the result analysis module 236 may process on-going or normal data received from the photo booth 200. For example, the result analysis module 236 may process the photos 242 received from the photo booth 200 to determine that the components of the photo booth 200 are operating within desired parameters. In some cases, the result analysis module 234 may analyze each of the photos 242 captured, while in other cases, the result analysis module 234 may analyze random photos 242 or periodically selected photos 242 to determine if the photo booth 200 is operating within desired parameters. Additionally, the result analysis module 236 may monitor the status of the communication channels between the management system and the photo booth 200. For instance, repeated disconnections between the photo booth 200 and the management system may indicate issues with a communication interface of the booth 200.

The alert module 238 may, in response to a determination that one or more components of the booth 200 is operating outside of expected parameters, send an alert to the management system. In other cases, the alert module 234 may be configured to the alert directly to a maintenance venue or personnel or to an error correction module 244 on the photo booth 200 that is responsible or assigned to maintain the booth 200. The alert to maintenance venue or personnel may be an additional that is provided in conjunction with the alert to the management system or in lieu of the alert to the management system.

In some cases, the error correction module 244 may be configured to reset or adjust various parameters associated with a malfunctioning component. For example, the focus 216 may be operating incorrectly and may simply need to be reset. The error correction module 244 may cause the focus 216 to disable and then re-enable to see if the restart corrects the issue prior to altering a maintenance venue or personnel.

Figure 3:
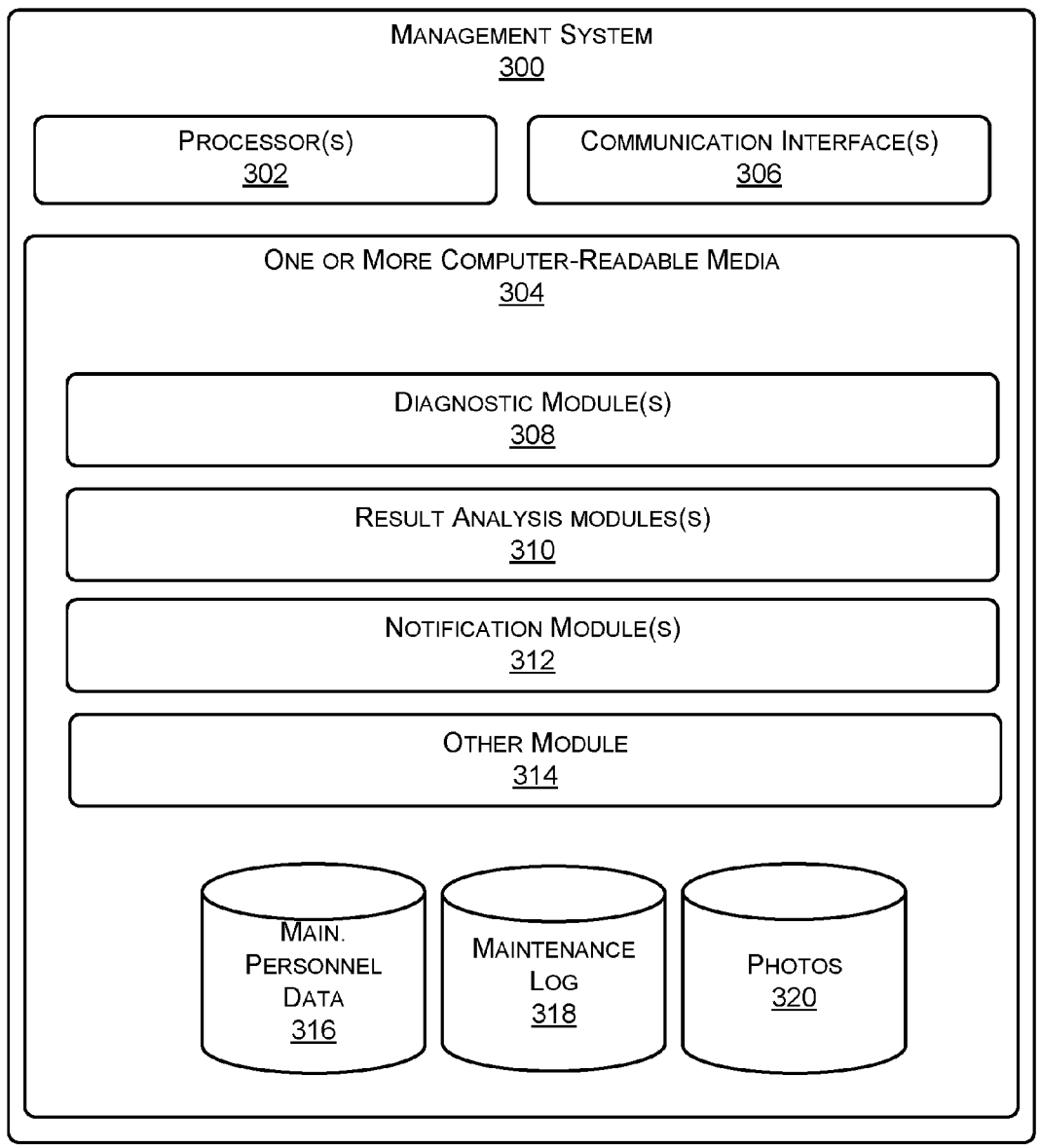
FIG. 3 illustrates example components of one or more servers associated with the management system according to some implementations.

FIG. 3 illustrates an example architecture of one or more servers associated with the management system 300 according to some implementations. The servers, which host the management system 300 collectively comprise processing resources, as represented by processors 302, and computer-readable storage media 304. The computer-readable storage media 304 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The servers may also include one or more communication interfaces 306, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 306 may allow the management system 300 to receive photos from one or more photo booths, as well as to communicate with one or more third party advertiser systems and/or merchant devices operating either in the cloud or co-located with the photo booths. In some case, a co-located management system may act as a proxy or additional tier for a cloud-based management system.

Several modules such as instruction, data stores, and so forth may be stored within the computer-readable media 304 and configured to execute on the processors 302. For example, a diagnostic module 308, a result analyzing module 310, a notification module 312, as well as other modules 314. In some implementations, the computer-readable media 304 may store data, such as maintenance personnel data 316, maintenance log 318, and photos 320 or data associated with the photos 320.

The diagnostic modules 308 may be configured to cause the photo booths to perform various tests on the hardware and/or systems to determine if the booth is operating within expected thresholds. For example, the diagnostic module 308 may cause a photo booth to respond to a request to determine if the communication interface is operating as accepted or to capture a photo and to return the image to the management system 300 for analysis to determine if the flash, aperture, shutter, or other camera component are operating as expected.

The result analysis module 310 may be configured to receive a result from the test initiated by the diagnostic module 308 to determine if the booth is operating as expected. For example, the result analysis module 310 may be configured to receive a photo captured by the booth and to compare or analyze the photo to determine if various thresholds are met or exceeded. For instance, the result analysis module 310 may determine that the flash failed to activate or activated at an incorrect time when the photo fails to meet a brightness threshold, histogram, or other image analysis technique associated with the light captured by the photo. In another example, the result analysis module 310 may determine the shutter failed to open if the image fails to meet a color contrast threshold.

In another example, the diagnostic module 308 may cause a projector associated with the photo booth to project a particular image onto a backdrop or wall and to cause the camera of the photo booth to capture an image of the backdrop or wall while the projector projects the particular image. For example, the image projected on the wall, backdrop, or ceiling may be for adverting or marketing purposes, instructions, or to present photos captured by the booth. In some cases, a result analysis module 310 may then be configured to analyze the photo captured by the booth for various aspects of the particular image against various thresholds, such as a color threshold, shape reproduction threshold, objects threshold (e.g., does the object reproduce correctly), location threshold (e.g., location of the objects within the photo), contrast threshold, sharpness threshold, image noise threshold, exposure range threshold, tone reproduction threshold, distortion threshold, vignetting threshold, exposure thresholds, lateral chromatic aberration (LCA) thresholds, lens flare thresholds, among others.

The notification module 312 may, in response to a determination that the booth is malfunctioning or may be operating outside of normal parameters, be configured to identify a maintenance personnel and to provide the identified maintenance personnel with a notification that the booth is malfunctioning. In some cases, the notification module 312 may select the maintenance personnel by determining that the maintenance personnel associated with the photo booth, is available, and/or within a predefined geographic proximity (e.g., 20 miles) to the booth. In some cases, the selection of the maintenance personnel may be based on a location (e.g., Global Position System (GPS) signal of the device 108 associated with personnel) and/or a schedule or calendar accessible to the management system. In other cases, the notification module 312 may be configured to send a notification to a maintenance venue (not shown) that then be responsible may assign a maintenance personnel to the booth.

The maintenance personnel data 316 may be utilized or accessed by the notification module 312 to assist with selecting a maintenance personnel to perform a maintenance visit to a booth 102 operating outside of the expected thresholds.

The maintenance log 318 may include data associated with each diagnostic, test, result, and/or determination related to the booth) by the diagnostic module 308 and/or the result analysis modules 310. The maintenance log 318 may also include data related to the maintenance venue or maintenance personnel assigned to affect repair of a malfunctioning booth. The maintenance log 318 may be sent or accessible to the administrative system to allow an administrator to review the log files to monitor the effectiveness, timeliness of various maintenance personnel as well as the overall up time of the photo booths.

The photos 320 captured by the various booths may also be maintained by the management system 300 to allow either the administrator or the maintenance personnel to view the photos 320 that caused the notification to be sent. In this manner, the maintenance personnel assigned to repair the booth may be able to more quickly determine the problem.

Figure 4:
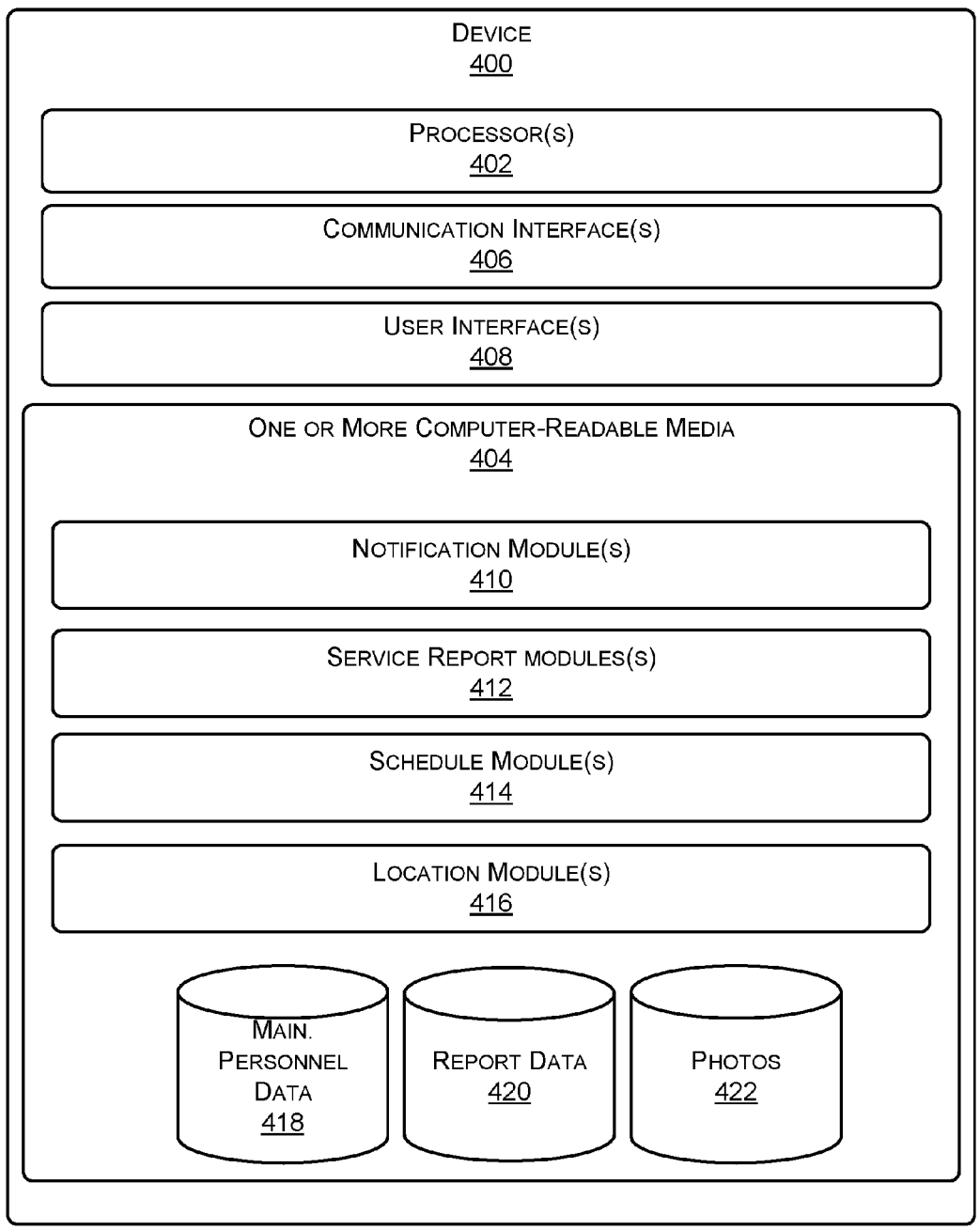
FIG. 4 illustrates example components of one or more devices associated with the maintenance personnel according to some implementations.

FIG. 4 illustrates example components of one or more devices 400 associated with the maintenance personnel according to some implementations. The devices 400 may host a photo booth application that may allow the maintenance personnel to send and receive communications with the photo booth and/or the management system of FIG. 1.

The device 400 may include one or more processors 402, and computer-readable storage media 404. The computer-readable storage media 404 may include volatile and non-volatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The device 400 may also include one or more communication interfaces 406, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 406 may allow the management system 400 to receive photos from one or more photo booths, as well as to communicate with one or more third party advertiser systems and/or merchant devices operating either in the cloud or co-located with the photo booths. In some case, a co-located management system may act as a proxy or additional tier for a cloud-based management system.

The device 400 may also include one or more user interfaces 408 which include both output interfaces for displaying or providing information to an end user and input interfaces for receiving user inputs from the end user. The user interfaces 408 may include various systems for interacting with the device 400, such as mechanical input devices (e.g., keyboards, mice, buttons, etc.), displays, touch screens, input sensors (e.g., motion, age, gender, fingerprint, facial recognition, or gesture sensors), and/or microphones for capturing natural language input such as speech.

Several modules such as instruction, data stores, and so forth may be stored within the computer-readable media 404 and configured to execute on the processors 402. For example, a notification module 410, a service report module 412, a schedule module 414, and a location module 416. In some implementations, the computer-readable media 404 may store data, such as maintenance personnel data 418, report data 420, and photos 320 and photos 422.

The notification module 410 may be configured to receive notifications related to one or more photo booths from the booths or a central management system. The notification module 410 may also be configured to respond to the notification. For example, the notification module 410 may determine that the associated maintenance personnel is available and in proximity to a booth experiencing an issue. The notification module 410 may then respond to the notification with an affirmation that the associated maintenance personnel will affect a repair of the booth experiencing an issue.

The service report module 412 may be configured to allow the maintenance personnel to enter a report after visiting a booth experiencing an issue and to send the report to the management system. In some cases, the service report module 412 may ask the maintenance personnel to answer specific questions related to the operation of the booth. The question may be generated in response to the particular issue the booth reported.

The schedule module 414 may be configured to access one or more other schedule applications operating on the device 400 and to determine the availability of the maintenance personnel. The schedule module 414 may then be configured to input an appointment to visit the booth into the maintenance personnel's schedule. The schedule module 414 may also provide information to the notification module 410 to assist with reporting back to the management system.

The location module 416 may be configured to access one or more other applications or GPS applications or components operation in conjunction with the device 400 and to determine if the booth experiencing an issue is within a predefined distance of the device 400. The location module 416 may also provide the location information to the notification module 410 to assist with reporting back to the management system.

Figure 5:
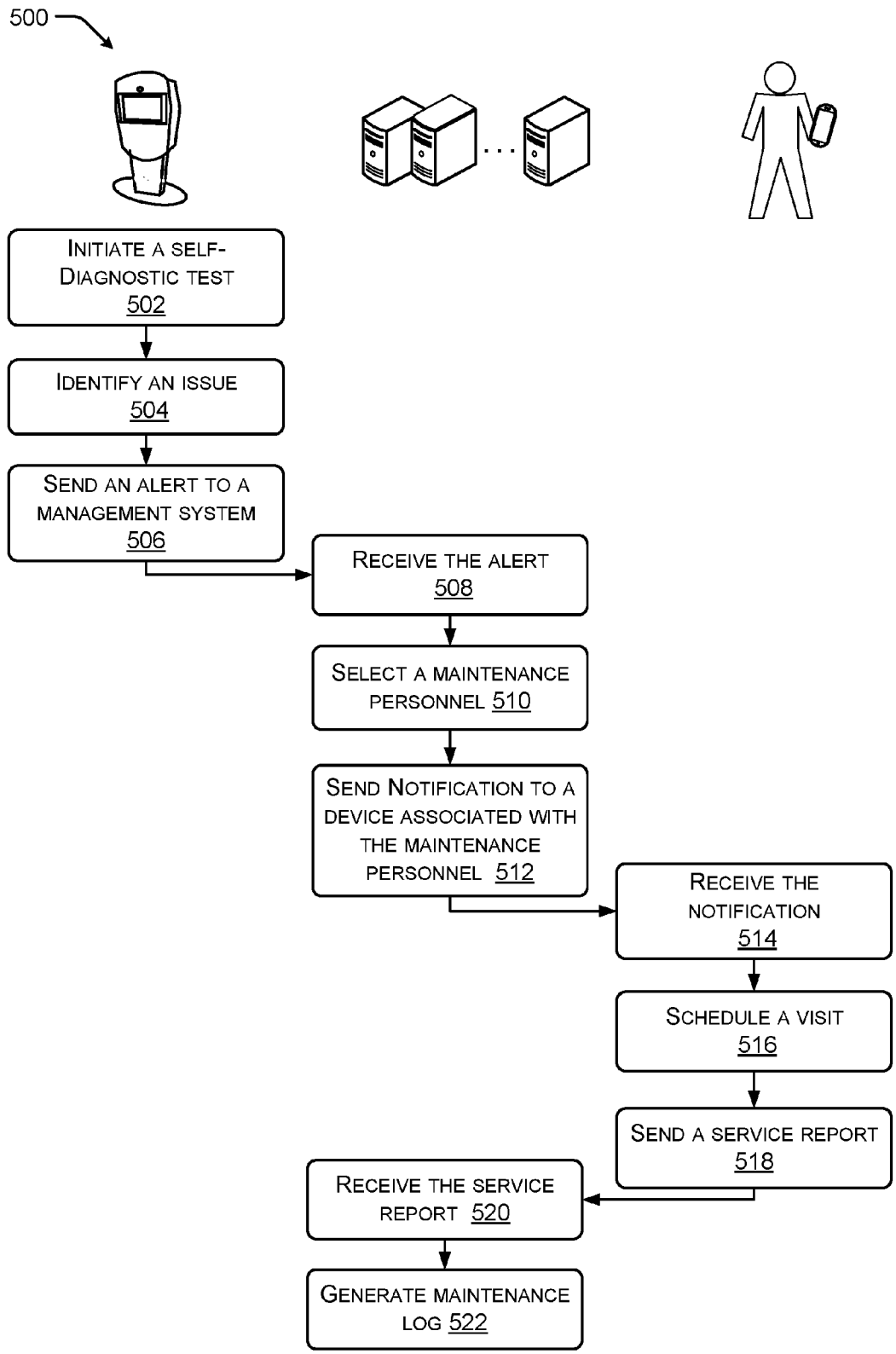
FIG. 5 is example flow diagram showing an illustrative process for monitoring an operational state of a photo booth according to some implementations.
Figure 6:
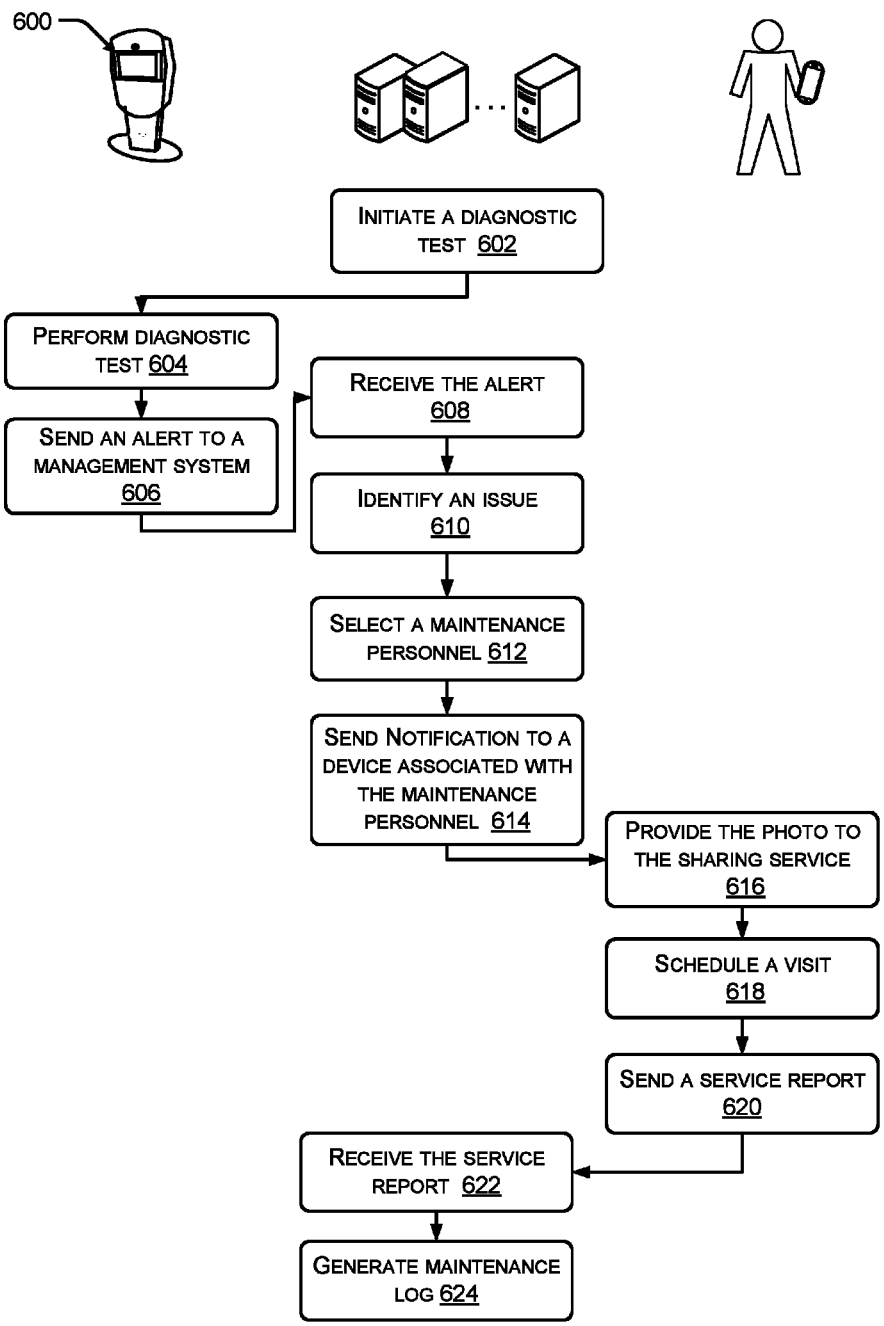
FIG. 6 is example flow diagram showing another illustrative process for monitoring an operational state of a photo booth according to some implementations.

FIGS. 5 and 6 are flow diagrams illustrating example processes associated with monitoring the operational health of a photo booth according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is example flow diagram showing an illustrative process 500 for monitoring an operational state of a photo booth according to some implementations. For example, a photo booth configured to perform self-initiated maintenance diagnostics and to alert in a management system in response to a failure of one or more systems.

At 502, the photo booth may initiate a self-diagnostic test. For example, the camera of the photo booth may become unfocused due to individuals bumping or touching the photo booth during use. The booth may perform a diagnostic test including capturing a photo and analyzing the resulting image, histogram, or other image analysis method associated with the image for clarity.

At 504, the photo booth may identify an issue with one or more components. For instance, in the example above, if the photo fails to exceed one or more clarity thresholds (e.g., the resulting image is blurry), the photo booth may attempt an auto-calibration of the camera, and cause the camera to capture another image. The photo booth may also analyze the second image against the clarity thresholds. If the second photo is also unclear or fails to meet the clarity thresholds, then some component of the camera may be malfunctioning.

At 506, the photo booth may send an alert to a management system. For example, if an issue is detected the photo booth may send data related to the test diagnostic run, the result of the test, and/or the photo or histogram utilized to detect the issue.

At 508, the management system receives the alert. In some cases, the alert may include the photo or histogram utilized to determine that an issue may have occurred. In these cases, the management system may analyze the photo or histogram in addition to the photo booth or in lieu of the photo booth to determine what the issue may be.

At 510, the management system may select a third party maintenance vendor or a maintenance personnel. In some cases, the management system may select a maintenance vendor or a maintenance personnel based on an assignment to the particular booth reporting an issue, a location of the maintenance vendor or a maintenance personnel, the location of the booth, a schedule or availability of the maintenance vendor or a maintenance personnel, etc.

At 512, the management system may send a notification to the selected party maintenance vendor or a maintenance personnel. For example, the management system may send a notification to an application associated with the photo booth operating or installed on a device associated with the selected maintenance vendor or a maintenance personnel.

At 514, the device associated with the maintenance vendor or a maintenance personnel receives the notification. The notification may include a data associated with the booth experiencing an issue, the photo or histogram, an expected issue, a suggested repair, or other information useful to affect a repair of the booth.

At 516, the device may schedule a visit to the booth for the maintenance vendor or a maintenance personnel receives. For example, a photo booth health monitoring application may operate on the device to receive the notification, access the maintenance vendor or a maintenance personnel's calendar and to schedule a visit. In other cases, the application may allow the maintenance vendor or a maintenance personnel to provide input to schedule a visits.

At 518, the device or the booth health monitoring application may send a service report back to the management system. For example, the service report may include a description of the issue as determined by the maintenance vendor or a maintenance personnel, the time of the repair visit, the repairs performed, and any other information the maintenance vendor or a maintenance personnel desires in the report.

At 520, the management system may receive the services report from the device and, at 522, the management system may generate a maintenance log associated with the visit for the booth. For example, the maintenance log may include the service report, any photo or histogram provided by the booth, the alert or any data associated with the alert, the notification or any data associated with the notification, and/or data associated with the selected maintenance vendor or maintenance personnel.

FIG. 6 is an example flow diagram showing another illustrative process 600 for monitoring an operational state of a photo booth according to some implementations. For example, a photo booth configured to perform remote initiated maintenance diagnostics and to alert in a management system in response to a failure of one or more systems.

At 602, a management system may initiate a diagnostic test for a photo booth. For example, the camera of the photo booth may become unfocused due to individuals bumping or touching the photo booth during use. The management system may cause the photo booth to perform a test from time to time to ensure the photo booth remains in working condition.

At 604, the photo booth performs the diagnostic test. For example, the diagnostic tests including capturing a photo and analyzing the resulting image, histogram, or other image analysis method associated with the image for clarity.

At 606, the photo booth may provide an alert associated with the diagnostic test to the management system. In some cases, the photo booth may send data associated with the test to the management system for processing. In an alternative implementation, the photo booth may provide the alert to the management system in response to internal monitoring of the photo booth. For example, the photo booth may monitor or process each photo captured based on one or more criteria, such as lighting, contrast, visibility, etc. and determine if each criteria is operating within an expected maximum and minimum thresholds. If the photo booth determines that one or more of the criteria is outside the maximum and minimum thresholds, the photo booth may send the alert. Similarly, the photo booth may monitor various internal components based on criteria and send alerts when a component may be operating outside of expected parameters.

At 608, the management system receives the alert. In some cases, the alert may include the photo or histogram utilized to determine that an issue may have occurred.

At 610, the management system may identify an issue with the photo booth. For instance, the management system may analyze the photo or histogram in addition to the photo booth or in lieu of the photo booth to determine what the issue may be. In one example, the management system may analyze a photo to determine if the photo fails to exceed one or more clarity thresholds (e.g., the resulting image is blurry), the photo booth may attempt an auto-calibration of the camera, and cause the camera to capture another image.

At 612, the management system may select a third party maintenance vendor or a maintenance personnel. In some cases, the management system may select a maintenance vendor or a maintenance personnel based on an assignment to the particular booth reporting an issue, a location of the maintenance vendor or a maintenance personnel, the location of the booth, a schedule or availability of the maintenance vendor or a maintenance personnel, etc.

At 614, the management system may send a notification to the selected party maintenance vendor or a maintenance personnel. For example, the management system may send a notification to an application associated with the photo booth operating or installed on a device associated with the selected maintenance vendor or a maintenance personnel.

At 616, the device associated with the maintenance vendor or a maintenance personnel receives the notification. The notification may include data associated with the booth experiencing an issue, such as the photo or histogram, an expected issue, a suggested repair, or other information useful to affect a repair of the booth.

At 618, the device may schedule a visit to the booth for the maintenance vendor or a maintenance personnel receives. For example, a photo booth health monitoring application may operate on the device to receive the notification, access the maintenance vendor or a maintenance personnel's calendar and to schedule a visit. In other cases, the application may allow the maintenance vendor or a maintenance personnel to provide input to schedule a visits.

At 620, the device or the booth health monitoring application may send a service report back to the management system. For example, the service report may include a description of the issue as determined by the maintenance vendor or a maintenance personnel, the time of the repair visit, the repairs performed, and any other information the maintenance vendor or a maintenance personnel desires in the report.

At 622, the management system may receive the services report from the device and, at 624, the management system may generate a maintenance log associated with the visit for the booth. For example, the maintenance log may include the service report, any photo or histogram provided by the booth, the alert or any data associated with the alert, the notification or any data associated with the notification, and/or data associated with the selected maintenance vendor or maintenance personnel.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A photo booth comprising:
    one or more cameras for capturing photos from an environment;
    one or more input interfaces;
    one or more output interfaces to display information;
    one or more communication interfaces to communicate with one or more cloud services, the one or more cloud services including a management system;
    one or more processors; and
    computer-readable storage media storing computer-executable instructions, which when executed by the one or more processors cause the one or more processors to:
        receive a user input from the input interface;
        cause the camera to capture a customer image of an environment in response to receiving the user input;
        cause the one or more communication interfaces to send the customer image to a user account;
        cause the camera to capture a test image of the environment;
        determine that the test image fails to meet or exceed a threshold; and
        send an alert to the management system in response to the image failing to meet or exceed the threshold.

2. The photo booth as recited in claim 1, wherein the threshold includes one or more of the following:
    a maximum brightness threshold;
    a minimum brightness threshold;
    a maximum color threshold;
    a minimum color threshold;
    a maximum clarity threshold;
    a minimum clarity threshold;
    a maximum shape reproduction threshold;
    a minimum shape reproduction threshold;
    a maximum contrast threshold;
    a minimum contrast threshold;
    a maximum sharpness threshold;
    a minimum sharpness threshold;
    a maximum noise threshold;
    a minimum noise threshold;
    a maximum exposure range threshold;
    a minimum exposure range threshold;
    a histogram range; or
    a histogram median.

3. The photo booth as recited in claim 1, wherein the one or more processors cause the camera to capture the test image of the environment in response to receiving a command from the management system.

4. The photo booth as recited in claim 1, wherein the alert includes the test image.

5. A method comprising:
    receiving data associated with components of a photo booth;
    determining from the data that the photo booth is experiencing a maintenance issue;
    identifying a maintenance personnel from a plurality of maintenance personnel to be dispatched;
    providing a notification to a device associated with the maintenance personnel; and
    receiving a service report from the device, the service report including data associated with a repair of the photo booth.

6. The method as recited in claim 5, further comprising:
    sending a signal to the photo booth to cause the photo booth to perform a diagnostic test.

7. The method as recited in claim 5, wherein the signal is sent in response to a period of time elapsing.

8. The method as recited in claim 5, wherein the signal is sent in response to a second signal received from an administrator system.

9. The method as recited in claim 5, wherein determining from the data that the photo booth is experiencing a maintenance issue includes:
    analyzing an image received from the photo booth.

10. The method as recited in claim 5, wherein determining from the data that the photo booth is experiencing a maintenance issue includes:
    determining that a first image received from the photo booth fails to meet a threshold;
    causing the photo booth to capture a second image;
    determining that the second image received from the photo booth fails to meet the threshold.

11. The method as recited in claim 5, further comprising:
    receiving an alert from a photo booth, the alert including the data associated with the components of the photo booth.

12. The method as recited in claim 5,
    wherein determining from the data that the photo booth is experiencing a maintenance issue includes:
        comparing an image received from the photo booth to a stored image captured by the photo booth at an earlier period of time.

13. The method as recited in claim 5, wherein identifying the maintenance personnel to be dispatched is based at least in part on a location of the maintenance personnel received from the device.

14. One or more non-transitory computer-readable media having computer-executable instructions that, when executed by one or more processors, cause the one or more processors to perform operations comprising:
    sending a command to a photo booth to cause the photo booth to perform one or more diagnostic tests;
    receiving an image from the photo booth in response to sending the command;
    determining, at least in part based on the image, that the photo booth is experiencing a maintenance issue;

identifying a maintenance person to be dispatched from a plurality of maintenance personnel; and providing a notification to a device associated with the maintenance person.

15. The one or more computer-readable media as recited in claim 14, further comprising receiving a service report from the device, the service report including data associated with a repair of the photo booth.

16. The one or more computer-readable media as recited in claim 14, wherein the notification includes an identification of the photo booth.

17. The one or more computer-readable media as recited in claim 14, wherein determining that the photo booth is experiencing the maintenance issue further comprises comparing the image a stored image captured by the photo booth at an earlier period of time.

18. The one or more computer-readable media as recited in claim 16, further comprising:

sending a third command to the photo booth to cause the photo booth to perform one or more second diagnostic tests; and receiving a second image from the photo booth in response to sending the third command.

19. The one or more computer-readable media as recited in claim 18, further comprising:

determining from the second image that the photo booth is experiencing the maintenance issue prior to providing the notification.

20. The one or more computer-readable media as recited in claim 14, wherein determining that the photo booth is experiencing the maintenance issue includes comparing the image to one or more thresholds.

* * * * *